United States Patent Office 2,978,075
Patented Apr. 4, 1961

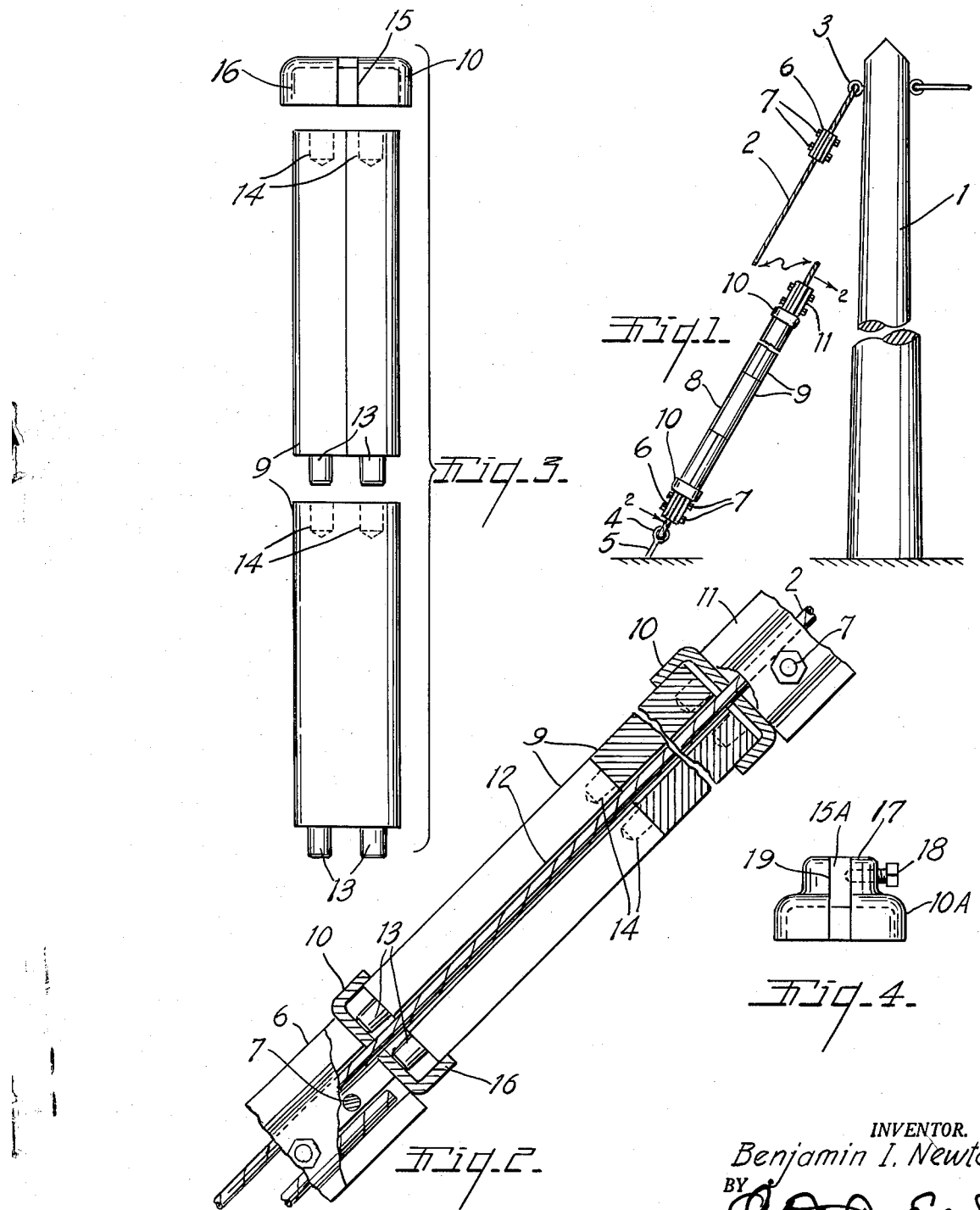

2,978,075

CABLE GUARDS

Benjamin I. Newton, R.R. 4, South Haven, Mich.

Filed Feb. 23, 1956, Ser. No. 567,133

4 Claims. (Cl. 189—31.5)

This invention relates to improvements in cable guards.

The principal objects of this invention are:

First, to provide a guard for cables such as the guy cables of utility poles which will be inexpensive and easy to apply in a variety of lengths.

Second, to provide a cable guard made up of a plurality of identical wooden sections that are self interlocking and that adequately protect the cable.

Third, to provide a cable guard that is light and inexpensive and which fully protects the cable completely therearound.

Other objects and advantages of the invention will be apparent from a consideration of the following description and claims. The drawings, of which there is one sheet, illustrates a highly practical form of the cable guard and one modified form of end fitting therefor.

Fig. 1 is a fragmentary elevational view of a utility pole and guy cable with the cable guard mounted on the cable.

Fig. 2 is a fragmentary longitudinal cross sectional view through the cable and guard taken along the plane of the line 2—2 in Fig. 1.

Fig. 3 is an exploded elevational view of a portion of the cable guard.

Fig. 4 is an elevational view of a modified form of end fitting for the guard.

Fig. 1 illustrates a utility pole 1 set in the ground with a guy cable 2 extending from an eye bolt 3 near the top of the pole to an eye 4 on the end of an anchor rod 5. The ends of the cable 2 are threaded through the eyes and clamped upon themselves by cable clamps 6 as is common in utility pole installations. The clamps 6 consist of opposed plates clamped together on opposite sides of the cable by bolts 7.

The cable guard which is commonly applied to the lower end of the guy cable is indicated generally at 8 and consists of a plurality of identical wooden blocks 9 interlocked around the cable and retained at their ends by metallic end caps 10. The lower end cap 10 is seated against the lower cable clamp 6 while a second cable clamp 11 retains the upper end cap longitudinally in place.

As appears more clearly in Figs. 2 and 3 each of the wooden blocks 9 consists of a flat piece of wood having a cable receiving groove 12 formed longitudinally along one side thereof. Two blocks 9 are positioned in facing relation on opposite sides of the cable to enclose the cable in the mating grooves 12. Each of blocks 9 has a pair of dowels 13 formed on one end thereof and a pair of dowel holes 14 formed in the other end thereof and aligned with the dowels. The spacing between dowels and dowel holes is equal to twice the thickness of the block between the grooved face and the adjacent side of a dowel hole so that alternate pairs of the blocks can be rotated 90° about the axis of the cable with the dowels of one pair of blocks entering into the dowel holes of each of the subadjacent blocks. One pair of blocks thus locates the adjacent pair of blocks around the cable.

In order to retain the exposed ends of the end pairs of blocks on the cable the end caps 10 are telescoped over the ends of the end pairs of blocks to prevent transverse separation of the pair of blocks. The end caps 10 are metallic cup shaped members sized to closely embrace the ends of a pair of blocks and slotted as at 15 so that the end caps can be slipped over the cable and slid axially over the ends of the guard blocks. The depth of the recess 16 in the end caps 10 is sufficient to receive the dowel pins 13 on one end of the guard and still engage the side surfaces of the ends of the blocks. When the end caps 10 are retained longitudinally on the cable as by the cable clamps 6 and 11 it is impossible for any of the guard blocks to be removed.

If for any reason the cable guard is to be applied at a point where the use of the cable clamps 6 and 11 would be objectionable a modified end cap as shown in Fig. 4 may be substituted for the end cap 10. The modified end cap 10A is a cup shaped member having a slot 15A in one side thereof as in the first form of the end cap but further is provided with an end boss 17 in which a clamp screw 18 is threaded. The slot 15A extends through one side of the boss 17 as at 19 to receive the cable and the clamp screw 18 which is adjustable into the slot to clamp the end cap to the cable.

From the foregoing it will be apparent that the cable guard is not only light and inexpensive due to the wooden character of the guard blocks but is also easily applied in any length by multiplying the number of blocks used and further completely surrounds the length of the cable to which it is applied. The parts of the cable guard are fully reuseable and there are no sharp fastening elements to abrade the cable or to injure persons coming in contact with the guard.

Having thus described the invention, what is claimed as new and is desired to be secured by Letters Patent is:

1. A cable guard comprising a plurality of pairs of similar wooden block members having grooves formed in one face thereof and positioned in facing relation on opposite sides of a cable with the cable received in said grooves, a pair of longitudinally projecting dowels on one end of each member and spaced transversely on opposite sides of the groove in the member by a distance equal to twice the distance between each pin and the grooved face of the member, the opposite ends of each member having dowel holes formed therein in aligned positions with the dowels thereof, each successive pair of block members in the guard being rotated 90° from the adjacent pair of members whereby the dowels of one block member are received in and engage both blocks of an adjacent pair of block members, end caps telescopically embracing the ends of the end pairs of block members to prevent lateral separation thereof, said end caps being transversely sloted from one side to the center to permit assembly on a cable, and means on the cable axially retaining said end caps against the exposed ends of said block members.

2. A cable guard comprising a plurality of pairs of similar block members having grooves formed longitudinally in one face thereof and positioned in facing relation on opposite sides of a cable with the cable received in said grooves, a pair of longitudinally projecting dowels on one end of each member and spaced transversely on opposite sides of the groove in the member by a distance equal to twice the distance between each pin and the grooved face of the member, the opposite ends of each member having dowel holes formed therein in aligned positions with the dowels thereof, each successive pair of block members in the guard being rotated 90° from the adjacent pair of members whereby the dowels of one block member are received in and engage both blocks of an adjacent pair of block members, end caps telescopically embracing the ends of the end pairs of block members to prevent lateral separation thereof, said end caps being transversely slotted from one side to the center to permit assembly on a cable, and means axially retaining said end caps against the exposed ends of said block members.

3. A cable guard comprising a plurality of pairs of similar block members having grooves formed longitudinally in one face thereof and positioned in facing relation on opposite sides of a cable with the cable received in said grooves, a pair of longitudinally projecting dowels on one end of each member and spaced transversely on opposite sides of the groove in the member by a distance equal to twice the distance between each pin and the grooved face of the member, the opposite ends of each member having dowel holes formed therein in aligned positions with the dowels thereof, each successive pair of block members in the guard being rotated 90° from the adjacent pair of members whereby the dowels of one block member are received in and engage both blocks of an adjacent pair of block members, end caps telescopically embracing the ends of the end pairs of block members to prevent lateral separation thereof, said end caps being transversely slotted from one side to the center to permit assembly on a cable, and means on the end caps clampingly engaging the cable and axially retaining said end caps against the exposed ends of said block members.

4. A cable guard comprising a plurality of pairs of similar wooden block members having grooves formed in one face thereof and positioned in facing relation on opposite sides of a cable with the cable received in said grooves, a pair of longitudinally projecting dowels on one end of each member and spaced transversely on opposite sides of the groove in the member by a distance equal to twice the distance between each pin and the grooved face of the member, the opposite ends of each member having dowel holes formed therein in aligned positions with the dowels thereof, each successive pair of block members in the guard being rotated 90° from the adjacent pair of members whereby the dowels of one block member are received in and engage both blocks of an adjacent pair of block members, means embracing the ends of the end pairs of block members to prevent lateral separation thereof, and means retaining the exposed ends of said block members on said cable.

References Cited in the file of this patent

UNITED STATES PATENTS

| | | |
|---|---|---|
| 49,386 | Cross | Aug. 15, 1865 |
| 403,858 | Reeves et al. | May 21, 1889 |
| 533,700 | Boyd et al. | Feb. 5, 1895 |
| 722,249 | Pixley | Mar. 10, 1903 |
| 1,207,504 | Converse | Dec. 5, 1916 |
| 2,001,893 | Seelye | May 21, 1935 |
| 2,162,123 | Richter | June 13, 1939 |

FOREIGN PATENTS

| | | |
|---|---|---|
| 795,549 | France | Jan. 8, 1936 |
| 910,444 | France | Jan. 28, 1946 |

OTHER REFERENCES

Page 149 of the August 9, 1913, issue of Engineering Record.